United States Patent [19]

Long et al.

[11] 4,018,990
[45] Apr. 19, 1977

[54] DIGITAL VIDEO SYNCHRONIZER
[75] Inventors: Ronald D. Long, San Jose; Allan L. Swain, Palo Alto; Thomas C. Lyon, San Jose, all of Calif.
[73] Assignee: Consolidated Video Systems, Inc., Sunnyvale, Calif.
[22] Filed: Feb. 13, 1975
[21] Appl. No.: 549,571
[52] U.S. Cl. .................................. 358/149; 358/8; 358/19
[51] Int. Cl.² ......................................... H04L 7/00
[58] Field of Search ............ 178/69.5 TV, 69.5 CB, 178/69.5 R; 328/55, 72, 73, 75; 358/1, 13, 19, 8

[56] References Cited
UNITED STATES PATENTS

| | | | |
|---|---|---|---|
| 3,763,317 | 10/1973 | Coleman, Jr. et al. | 178/69.5 TV |
| 3,795,763 | 3/1974 | Golding et al. | 178/69.5 TV |
| 3,906,367 | 9/1975 | Hoeschele, Jr. et al. | 178/69.5 R |

*Primary Examiner*—Malcolm A. Morrison
*Assistant Examiner*—Errol A. Krass
*Attorney, Agent, or Firm*—Townsend and Townsend

[57] ABSTRACT

A method and apparatus for synchronizing unrelated video type signals from two different sources without employing feedback loops between the two sources.

Incoming video signals are converted from analog to digital form and are clocked into a shift register unit by input clock signals phase and frequency locked to the instantaneous horizontal frequency and the color burst frequency portions of the incoming signal. The digitized video signals progressing along the shift register are stored at the input clock signal rate in a random access (RAM) having a sufficient capacity to provide continuous output video signals during each field. The signals are clocked out from the RAM by output clock signals derived from the sync and color burst portions of a local signal comprising either composite video or composite color burst, which are synchronized with the local sync generator. The video signals fetched from the RAM are converted from digital to analog form by the output clock signals, are processed to include standard sync, blanking and color burst signals, and are coupled to follow-on equipment.

The sync burst portions of the incoming non-synchronized video signals are deleted during storage in the shift register so that a smaller shift register can store an entire video field. The shift register has a plurality of output taps providing different coarse delay periods only one of which is enabled by a vertical sync pulse in the output clock train prior to transfer of a given field into the RAM.

18 Claims, 17 Drawing Figures

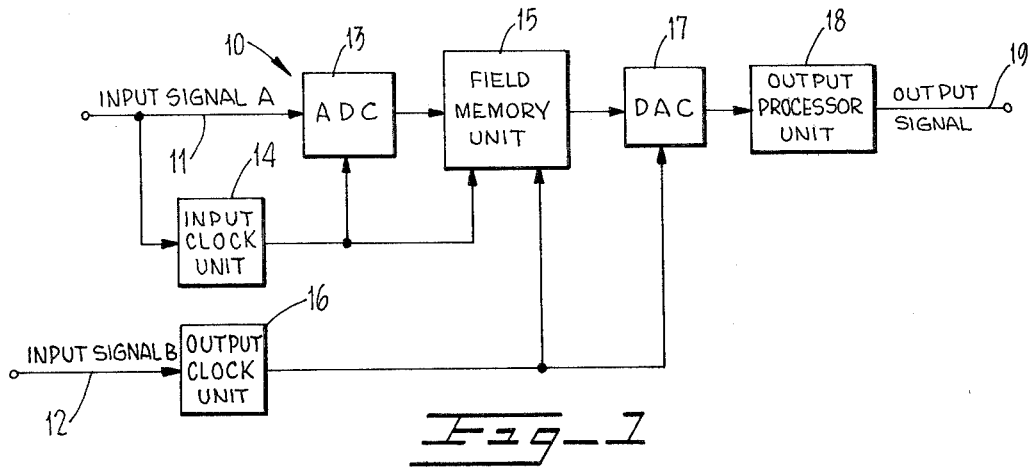
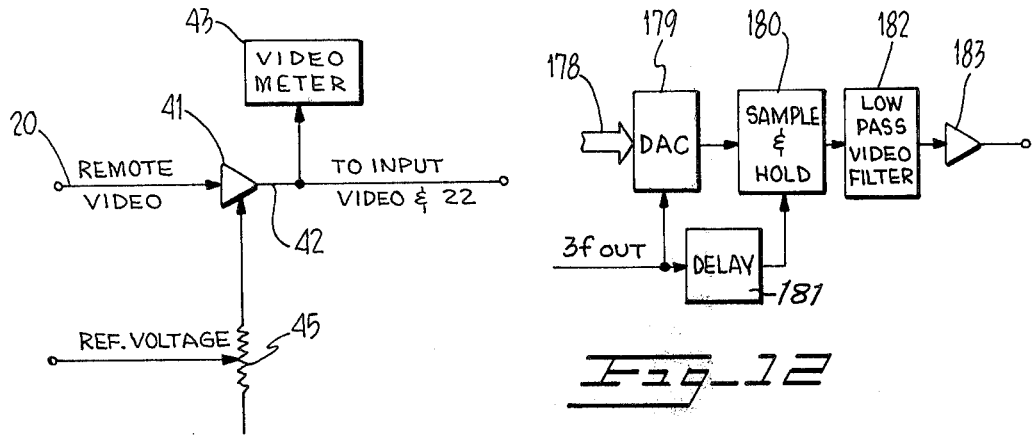
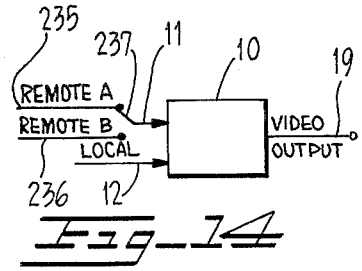
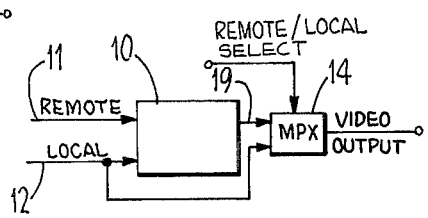
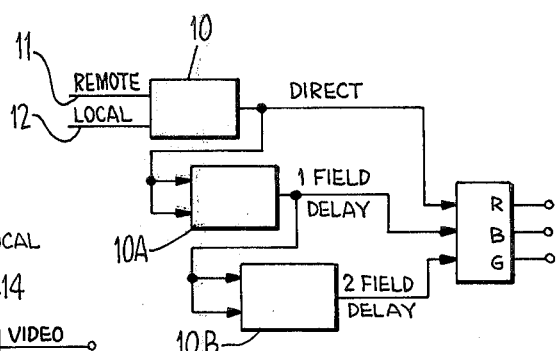

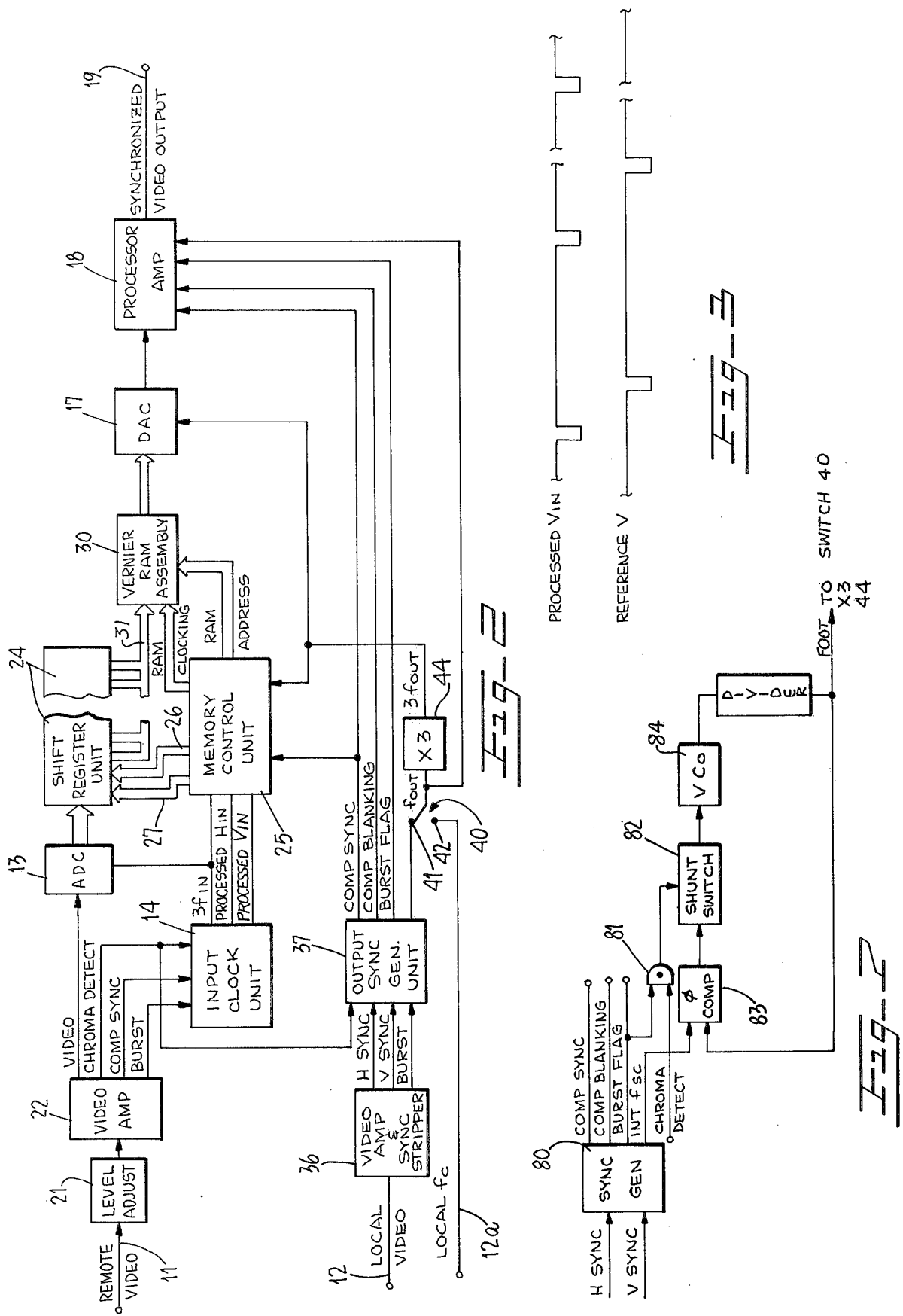

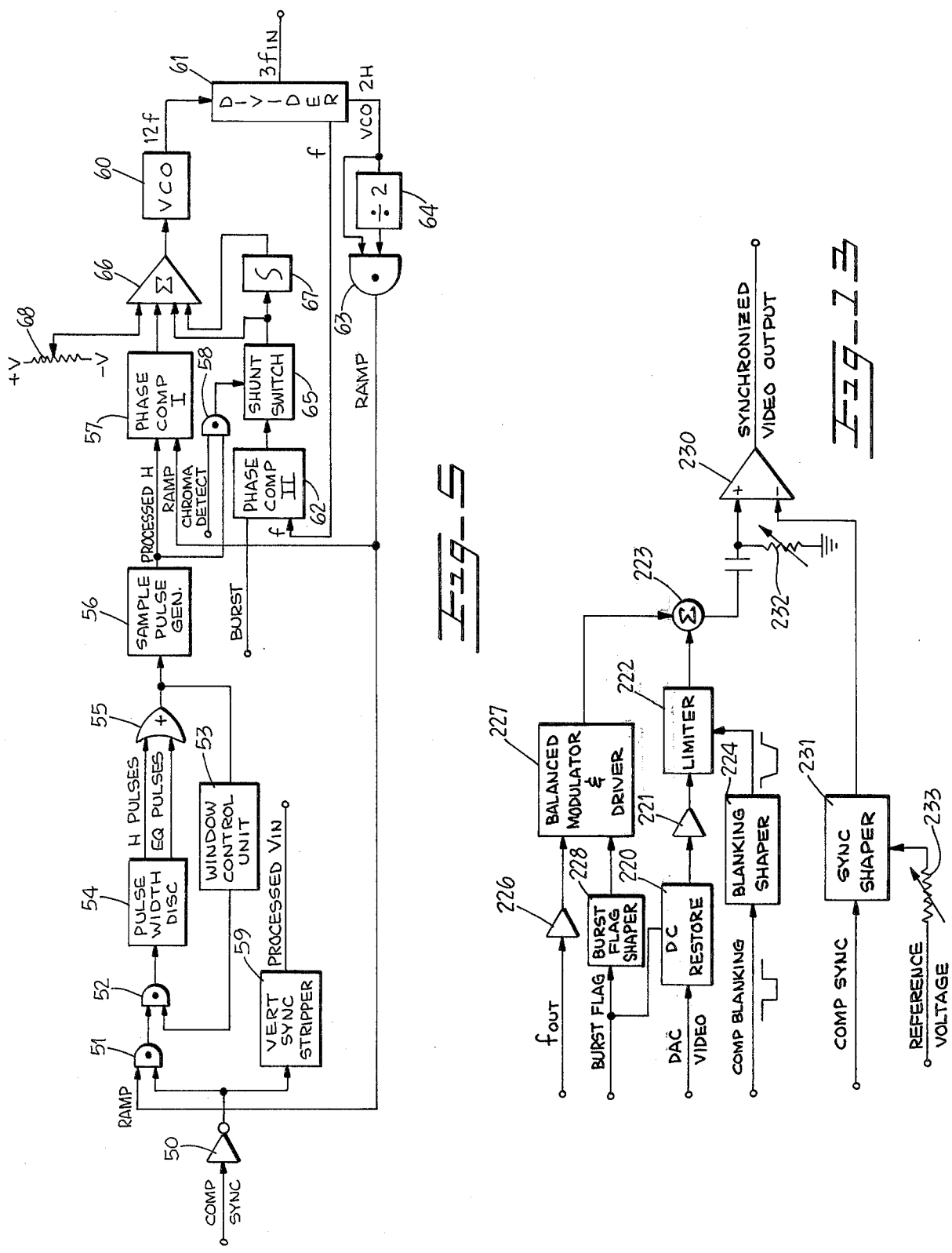

DIGITAL VIDEO SYNCHRONIZER

BACKGROUND OF THE INVENTION

This invention relates to apparatus and method for processing video type signals. More particularly, this invention relates to the processing of signals using digital techniques for the purpose of synchronizing two unrelated video signals on a field by field basis.

In the field of video broadcasting, stringent requirements are placed by the broadcasting authority on both monochromatic, commonly termed black and white, and color signals to be transmitted. In the NTSC color system, for example, the horizontal frequency $H = 15,734$ HZ of the video signal must be held to a tolerance of $\pm .04$Hz while the color frequency $f_c = 3.58 \times 10^6$ HZ must be held to a tolerance of $\pm 10$ HZ. In addition, for color broadcasting, the color frequency $f_c$ must equal $227.5$ H with successive lines having color burst with a phase difference of exactly 180°.

For video signals originating in the broadcast studio, the required frequency and phase relationships are maintained to the specified accuracy by using a studio sync generator and locking the entire studio equipment, e.g., TV cameras, video tape recorders, editing equipment and the like to the composite sync, composite blanking and burst signals produced by the studio sync generator, which typically contains a crystal controlled precise clock source. This arrangement suffers from the disadvantage that each piece of studio equipment must be hard wired to the studio sync generator by means of feedback loops in order to insure that any frequency drift in the individual units is corrected before signals emanating from signal sources are output to the transmitter link. In large studios, this requires a complex network of interconnecting cables which introduce signal losses which must be compensated for and which are prone to mechanical wear and breakdown.

It is frequently desirable, and sometimes necessary, to couple a remote source of video signals to the central broadcast studio in order to provide remote TV coverage which may be live or pre-recorded. This is typically accomplished by dedicating a communication link between the remote site and the central broadcast studio over which the video information is transmitted, such as microwave repeater station or telephone lines. Since each remote unit must be synchronized to the studio sync generator, it has been necessary to provide precise timing standards at each remote location and additional dedicated communication links for synchronizing the remote timing sources with the studio sync generator. This synchronizing procedure is time consuming and requires highly skilled personnel and costly timing equipment, e.g. rubidium clock sources, at both ends of the communication link. Moreover, due to the delays introduced by the transmission of the signals along finite distances and other factors, phase and frequency errors are nevertheless introduced into the remote signals which result in signal degradation when switching from one remote source to the central studio source, or from one remote source to another remote source. Efforts to provide a low cost video synchronizing system which can be quickly initialized and which is free of such signal degradation have not met with wide success.

SUMMARY OF THE INVENTION

The invention comprises a method and apparatus for synchronizing unrelated video type signals from two different sources without necessitating costly feedback loops for master synchronizing signals and which is capable of quick installation and set up. The invention permits video type signals from one or more remote sources to be directly switched into the broadcasting equipment of a studio without signal degradation and requires only a minimum number of conventional remote communications links, including telephone lines, microwave repeaters and satellite relay stations.

According to the invention, incoming video signals are converted from analog to digital form and are clocked into a shift register by input clock signals derived from the horizontal sync and color burst portions of the incoming signals. The input clock signals are phase and frequency locked to the instantaneous horizontal frequency and the color burst frequency portions of the incoming signal. The digitized video signals progressing along the shift register are stored at the input clock signal rate in a random access memory having a sufficient capacity to provide continuous output video signals during each field. The stored video signals are clocked out from the random access memory by output clock signals derived from the composite sync and color burst portions of a local signal comprising either composite video or composite sync and color burst, which is synchronized with the station sync generator. More particularly, the output clocking signals are phase and frequency locked to the vertical, horizontal, and color burst frequency portions of the local video signal. The video signals fetched from the random access memory are converted from digital to analog form by the output clock signals and are coupled to the follow-on broadcast equipment. In the case of color signals, the reconverted synchronized video information signals are provided with composite sync, composite blanking and, in the case of color video, color burst reference signals which are also phase locked to the local signal source.

In the preferred embodiment, the vertical sync, horizontal sync and color burst portions of the incoming non-synchronized video signals are deleted during storage in the shift register in order to permit the use of a smaller shift register memory to store an entire field of video information. In addition, the shift register has a plurality of output taps providing different coarse delay periods, only one of which is enabled during transfer of a given field into the random access memory. The particular tap selected is determined by conditioning the memory control unit for tap selection at the beginning of a field in the local reference signal, which is specified by the occurrence of a vertical sync pulse in the output clock signal train, and by enabling output to the random access memory from the shift register tap which provides the necessary coarse delay at the beginning of the field in the advancing digitized input video signal. The tap is specified by examining the output of a counter which is initialized by the occurrence of a vertical sync pulse in the incoming input video signal and which is incremented thereafter by the input clock signal train.

For a fuller understanding of the nature and advantages of the invention, reference should be had to the ensuing detailed description taken in conjunction with the accompanying drawings.

BRIEF DESCRIPTION OF THE DRAWINGS

FIG. 1 is a general block diagram illustrating the principle of the invention;

FIG. 2 is a block diagram of a preferred embodiment of the invention;

FIG. 3 is a timing diagram illustrating the principle of the invention;

FIG. 5 is a block diagram of the input clock unit;

FIG. 7 is a block diagram of the output sync generator unit;

FIG. 8 is a block diagram of memory control unit 25;

FIG. 12 is a block diagram of DAC 17;

FIG. 13 is a block diagram of processor amplifier 18; and

FIGS. 14–16 illustrate alternate system applications.

DESCRIPTION OF THE PREFERRED EMBODIMENT

Figure 6:
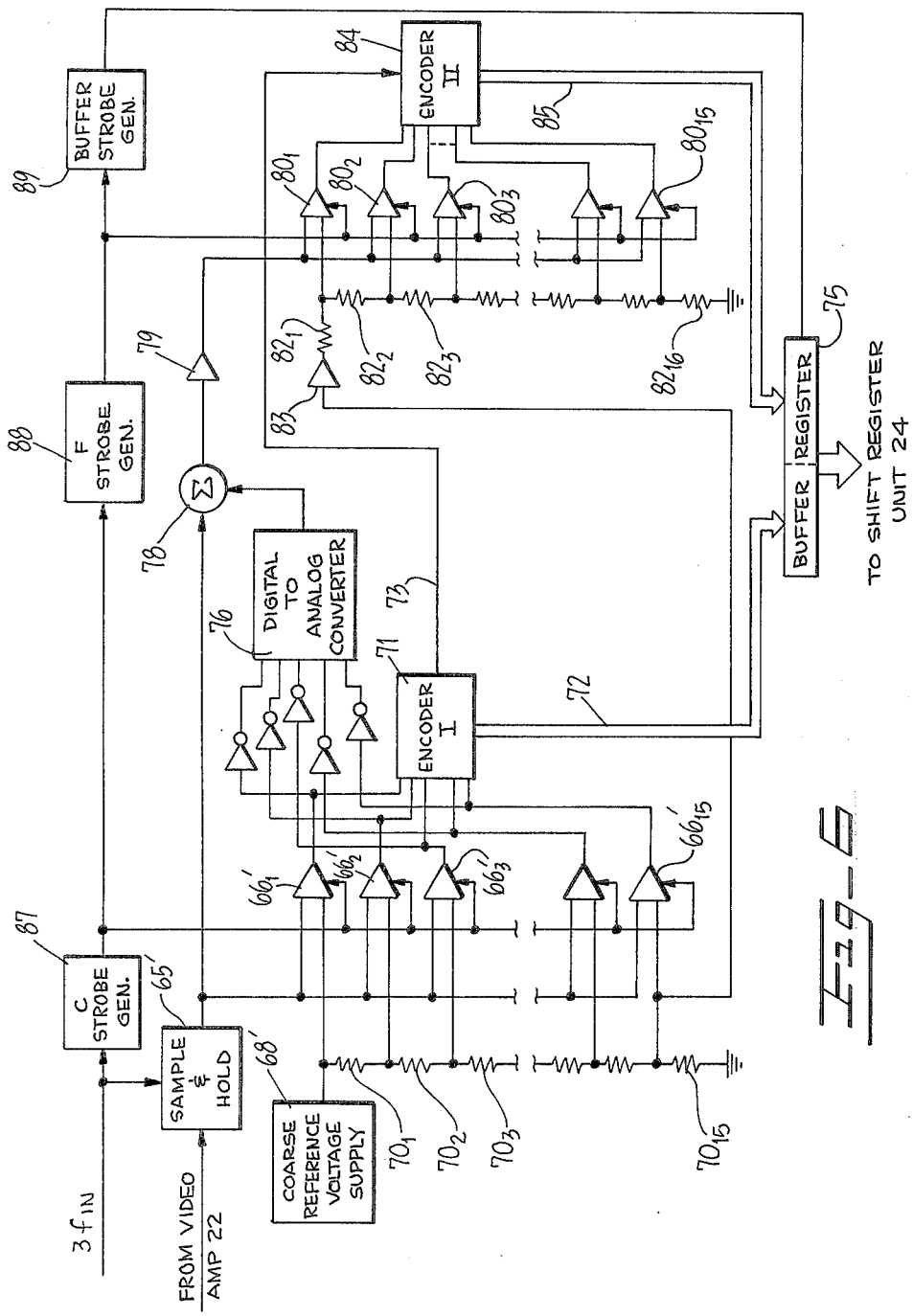
FIG. 6 is a block diagram of ADC 13.

Turning now to the drawings, FIG. 1 is a generalized diagram illustrating the principle of operation of the invention. As seen in this figure, a first video input signal designated Input Signal A is coupled to a first input terminal 11 and a second reference signal designated input signal B is coupled to a second input terminal 12. Input signal A may comprise any NTSC monochromatic or direct color composite video signal which may or may not be synchronously related to Input Signal B. Input signal B may comprise any NTSC direct color or monochromatic composite video signal which is synchronized with the associated studio sync generator, or the composite sync and color subcarrier $f_{sc}$ output of the studio sync generator.

The signal on terminal 11 is coupled to the input of an analog to digital converter 13, hereinafter designated ADC 13, and also to an input clock unit 14. The output of ADC 13 is coupled to the data input of a digital memory unit 15 designated as a Field Memory Unit to connote the capability of this element to store an entire field of video information, i.e. 262 ½ horizontal lines of video information. The output of input clock unit 14 is coupled to the sample and store input of ADC 13, and also to a first clock input of field memory unit 15.

The signal on input terminal 12 is coupled to the input of an output clock unit 16, the output of which is coupled to the fetch clock input of field memory unit 15 and the clock input of a digital to analog converter 17, hereinafter designated DAC 17. The output of field memory unit 15 is coupled to the data input of DAC 17, the output of which is coupled via an output processor unit 18 to an ouput signal terminal 19. In operation, the input signal A is converted from analog to digital form in ADC 13 and stored in field memory 15 at a rate determined by the clock signal train generated by input clock unit 14. The clock signal train generated by input clock unit 14 has a frequency of substantially $3f_c$, where $f_c$ is the NTSC color burst frequency noted above, and is phase and frequency locked to the horizontal sync and color burst portions (the latter when Input Signal A is a direct color signal) of Input Signal A. Thus, the input clock signal train follows frequency and phase variations in the input signal so that the digitized portions of the input video signal A are stored in field memory unit 15 in accordance therewith.

The stored digital video signals are fetched from field memory unit 15 by a clock signal train generated by output clock unit 16 from the input signal B coupled to input terminal 12. This output clock signal train has a frequency substantially equal to $3f_c$ but follows any variations in the horizontal sync and color burst portions of input signal B. The fetched digital signals are reconverted to analog form in DAC 17 using the output clock signal train from unit 16, and the resulting analog video signals, which are synchronized to input signal B, are processed in output processor unit 18 to reinsert composite sync, composite blanking and color burst to provide standardized composite video signals on output signal terminal 19.

FIG. 2 is a block diagram illustrating the principle units comprising the preferred embodiment of the invention. As shown in this FIG., the incoming input video signals on terminal 11 designated REMOTE VIDEO are coupled via a level adjust unit 21 shown in FIG. 4 to the input of a conventional video amplifier 22 which includes composite sync, burst and chroma detect circuits. The video output of video amplifier 22 is coupled to the data input of ADC 13 shown in FIG. 7. The CHROMA DETECT, COMPOSITE SYNC and BURST signals derived by video amplifier 22 from the remote video are coupled to separate inputs of input clock unit 14 shown in FIG. 5. A first output designated $3f_{in}$ of input clock unit 14 is coupled to the respective clock inputs of ADC 13, a shift register unit 24, a vernier RAM assembly unit 30 and a memory control unit 25 shown in FIG. 8. The remaining output terminal of input clock unit 14, designated PROCESSED Vin, is coupled to the enable input of memory control unit 25.

Figure 11:
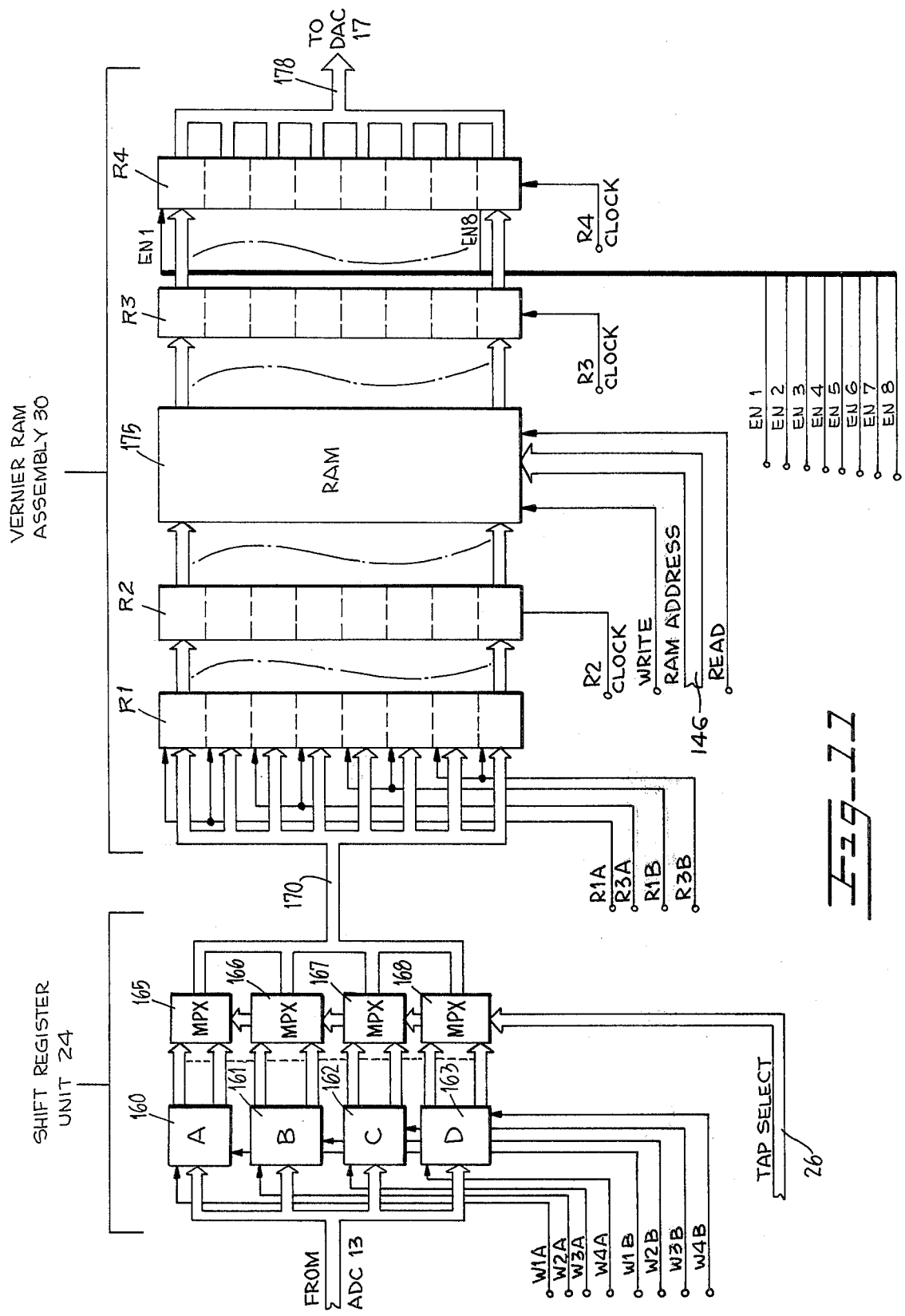
FIG. 11 is a block diagram of the field memory unit 15 comprising shift register unit 24 and Vernier RAM assembly 30.

The output of ADC 13, which comprises an 8 bit parallel digital character representative of a video sample, is coupled to the data input of a shift register unit 24 shown in FIG. 11. As described more fully below, shift register unit 24 comprises a plurality of individual shift registers providing a memory sufficiently large to store an entire field of video information in digital form in which the individual stored horizontal lines each comprises 576 successively generated 8 bit digital characters. The individual shift registers are each provided with a plurality of output taps or ports each spaced from the next succeeding tap by 1,024 bits. Each output tap is individually addressable by the tap selector output 26 by memory control unit 25 shown in FIG. 8 and the data is output to the input of a vernier random access memory assembly 30, hereinafter designated vernier RAM assembly 30, along a 64 bit data bus 31. In the preferred embodiment successive groups of 8 bit digital video characters are fetched from shift register unit 24 essentially in 64 bit parallel fashion and sequentially stored in vernier RAM assembly 30 in chronological addresses under the control of input clock signal train $3f_{in}$. The digital characters stored in vernier RAM assembly 30 are output therefrom to the data input of DAC 17 which converts the 8 bit digital characters successively presented at the input thereto into a smoothly varying analog video signal. The clock signals by which the digital characters are output from vernier RAM assembly 30 to DAC 17, and by which the characters are sampled and converted in DAC 17, designated $3f_{out}$, are generated by a sync generator 37, are independent of the input clocking signals $3f_{in}$ and are synchronized to the local signal. The output of DAC 17 is coupled to the input of processor amplifier 18 shown in detail in FIG. 13. The remaining inputs to processor amplifier 18 are composite sync, composite blanking, burst flag and color subcarrier $f_{sc}$ which are supplied thereto from sync generator 37.

The local video signal present on input terminal 12 is coupled to the input of a conventional video amplifier 36 similar in construction to video amplifier 22 and including a horizontal and vertical sync stripper. The vertical sync, horizontal sync and burst output signals from video amplifier 36 are coupled to separate inputs of sync generator 37 shown in FIG. 7. The output signal from sync generator 37 designated COMPOSITE SYNC is coupled to a control input of memory control unit 25. The remaining outputs of sync generator 37 are standard synchronizing signals routed to processor amp 18 and provided as supplemental system outputs via conventional output terminals. The $f_{sc}$ color subcarrier output of the sync generator 37 is coupled to a first terminal 41 of a selector switch 40. Local $f_{sc}$ color subcarrier signals from an external studio sync generator (not shown) may be coupled to a second terminal 42 of selector switch 40. The output terminal of switch 40 is coupled to the input of a conventional multiplier circuit 44 which multiplies the frequency of a signal input thereto by a factor of three in order to generate output clocking signals $3f_{out}$ which are coupled to memory control unit 25 and the clock input of DAC 17.

In operation, remote video signals are first level adjusted in level adjust unit 21, after which the video portion is separated in video amplifier 22 and coupled to the input of ADC 13. The composite sync and burst components of the remote video signals are separated and applied to the input clock unit 14 along with a conventional chroma detect signal which provides an enabling signal for a fine phase lock loop portion of input clock unit 14, described fully below, whenever the amplitude of the chrominance portion of the remote video signals lies above a predetermined threshold. Input clock unit 14 generates the $3f_{in}$ clocking signals which are phase and frequency locked to the horizontal sync and color burst portions of the remote video signal, and each succeeding line of incoming video information is converted to digital form at this clocking rate in ADC 13. Further, the digital video characters applied to the data input of shift register unit 24 are serially shifted therealong and output to vernier RAM 30 via data bus 31 at the $3f_{in}$ rate in the manner described below.

The $3f_{in}$ input clock signal train is also coupled to the clock input of memory control unit 25 for control purposes described more fully below.

Contemporaneously with the input of the remote video signals, either local video signals or local composite sync signals on terminal 12 are applied to video amplifier 36 in which the HORIZONTAL and VERTICAL sync and burst portions (if present) of the local signal are separated and applied to sync generator 37.

The composite sync signals output from output sync generator 37 are coupled to memory control unit 25 and act as supervisorial signals for conditioning tap selection control and enabling the output of digital characters from vernier RAM assembly 30 to DAC 17, and are also coupled to an input of processor amplifier 18 as information signals serving to enable the reinsertion of composite sync signals into the reconverted synchronized video signals. Composite blanking and burst flag signals from output sync generator 37 are also coupled to individual inputs of processor amplifier 18 for purposes described more fully below, and output color reference subcarrier signals $f_{sc}$ are coupled to input terminal 41 of switch 40. When switch 40 is placed in the position illustrated in FIG. 2, which corresponds to the case in which a local composite video signal is applied to input terminal 12, the output color subcarrier reference frequency $f_{sc}$ generated by sync generator 37 is coupled to a separate input of processor amplifier 18 and combined with burst flag in the manner described below to generate synthetic burst for insertion into the output video signals coupled to output terminal 19. In addition, these signals from sync generator 37 are coupled to the input of multiplier 44 which generates the 3f out clock signal train coupled to the clocking input of memory unit 25 and used as the clocking standard for fetching the digital characters from vernier RAM assembly 30 to DAC 17 and converting the digital signal characters input to DAC 17 to analog form. In the alternative mode of operation, local composite sync signals alone are applied to local input terminal 12 and are processed by video amplifier 36 to provide horizontal sync and vertical sync signals to the input side of output sync generator 37. In response thereto, composite sync, composite blanking and burst flag signals are generated by output sync generator 37 which function in a manner essentially identical to that described above. In this mode of operation, however, local color subcarrier reference frequency signals $f_c$ are applied to input terminal 12a which is coupled to terminal 42 of switch 40. With switch 40 placed in the alternate position, these local color reference subcarrier signals supply the standard for both processor amplifier 18 and multiplier 44.

In either mode of operation, the digital characters flowing through shift-register unit 24 at the $3f_{in}$ clock rate are stored in vernier RAM assembly 30 by the $3f_{in}$ clock signals, which are phase and frequency locked to the remote video signal. The digital characters thus stored in vernier RAM 30 are readout therefrom at a rate determined by the $3f_{out}$ clock signals in to DAC 17 in which successively appearing digital characters are converted to analog form, also at the $3f_{out}$ clock rate. The thus-converted signals, which are now synchronized to local video, are processed in processor amplifier 18 to insert composite sync, composite blanking and color burst which are phase and frequency locked to the local video or the studio sync generator depending on the position of switch 40.

With reference to FIG. 3, the remote video signals are synchronized to the local signals in the following manner. With remote video flowing through shift register unit 24, through one of the output taps thereof, and through vernier RAM assembly 30, the occurrence of a vertical sync pulse in the composite sync of the local signals conditions memory control unit 25 for selection of a different output tap (if necesary) of shift register unit 24. When the next succeeding vertical sync pulse in the remote video signal occurs, the tap selection process is enabled and a different tap is selected if the relative delay between the remote and the local signals has changed during the processing of the preceeding field. This effectively changes the delay introduced into the local video signals by shift register unit 24 and effects a coarse realignment of the remote and local signals. As described more fully below, in the preferred embodiment the taps in shift register unit 24 are effectively separated by 1,024 bit intervals termed a block of data, which corresponds to about 7.11 lines of video information. Contemporaneously with the selection of a new tap in shift register unit 24, the vernier RAM assembly 30 is also conditioned to provide a fine adjustment of the delay period between remote and local signals in the manner described below. Thereafter, the entire field of digital remote video information is output via the selected tap of shift register unit 24 in essentially 64 bit parallel mode to successive addresses in vernier RAM assembly 30 until the entire field has been output. At the end of the field in the remote video signal, the tap selection process is repeated.

LEVEL ADJUST UNIT 21

Figure 4:
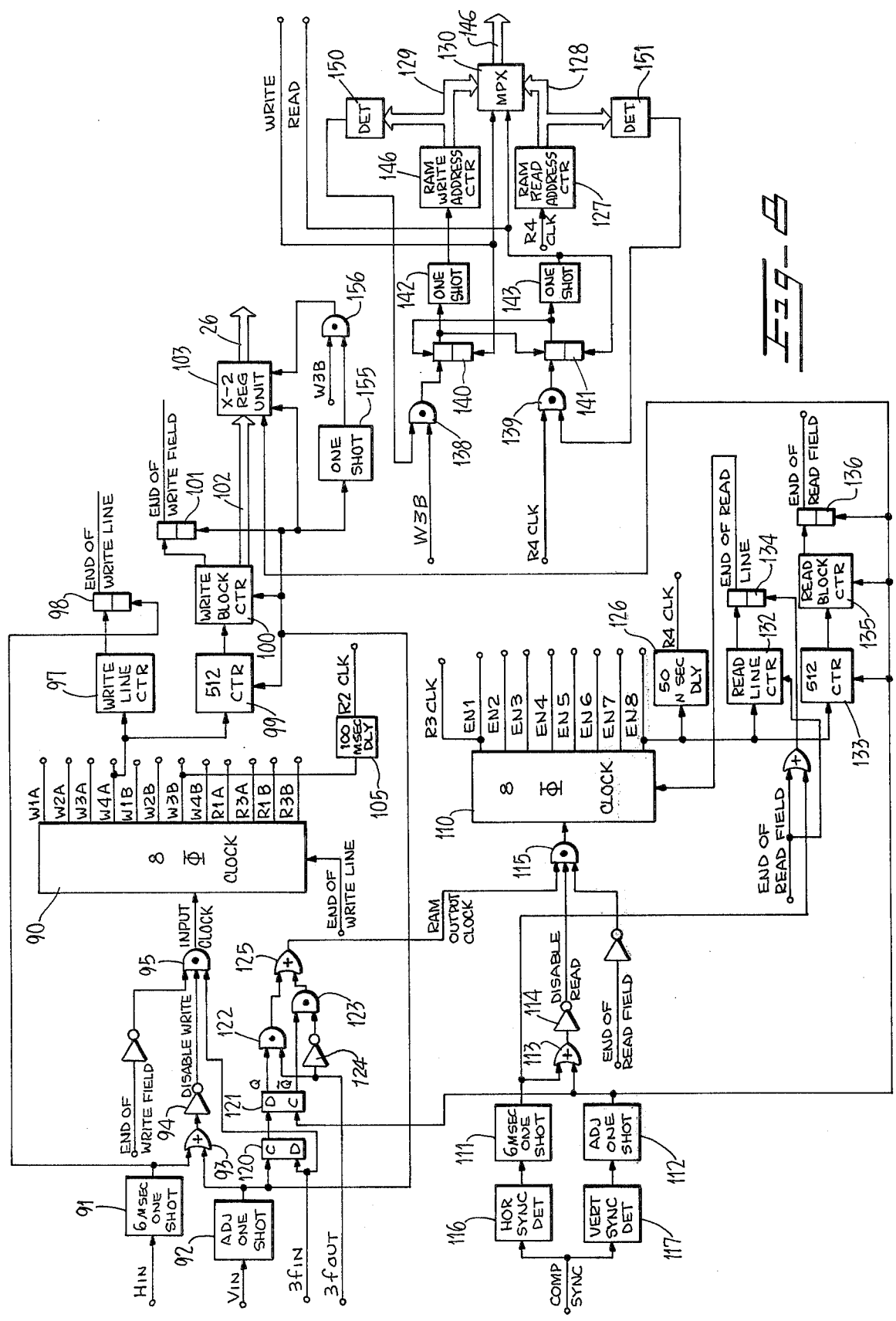
FIG. 4 is a block diagram of the level adjust unit 21.

With reference to FIG. 4, level adjust unit includes a variable gain amplifier 41 to which the remote video input signals are applied. The output terminal 42 of amplifier 41 is coupled to a conventional video meter 43 providing a visual indication of the rms amplitude level of the output signals present on terminal 42. A manually adjustable variable resistance 45 is coupled to the gain control input of the amplifier 41 so that the gain of the amplifier may be manually adjusted to provide output signals of the desired level.

INPUT CLOCK UNIT 14

With reference to FIG. 5, composite sync signals from input video amplifier 22 are coupled via an inverter 50 to a first input of an AND gate 51. The output of AND gate 51 is coupled to a first input of an AND gate 52, the remaining input to which is the output of a window control unit 53, described below. The output of AND gate 52 is coupled to the input of a conventional dual pulse width discriminating circuit for recognizing horizontal sync pulses lying in the range of about 4.2 to about 5.4 microseconds and equalizer pulses lying in the range from about 2.0 to about 2.7 microseconds. The outputs of dual pulse width discriminator 54, which comprise either valid horizontal sync pulses or valid equalizer pulses, are coupled via an OR gate 55 to the input of a sample pulse generator 56 and the input of window control unit 53. Sample pulse generator 56 is a conventional pulse generator circuit which generates a three microseconds wide sample pulse for each pulse input thereto. The output of sample pulse generator 56, termed PROCESSED H, is coupled to a first input of a first phase comparator 57 and to an input of an AND gate 58.

Window control unit 53 is a conventional delayed pulse generator which generates a train of six microsecond wide pulses centered about the expected arrival time of incoming horizontal sync pulses. In addition, this unit is provided with an internal disable time out circuit which is operative approximately 80 microseconds from the time of the last sample. Thus, if a horizontal sync pulse is not recognized by pulse width discriminator unit 54 within 80 microseconds from the last pulse so recognized, window control unit 53 is automatically disabled until the next pulse is received.

Composite sync is also coupled via inverter 50 to the input of a conventional vertical sync stripper 59. The processed Vin output of vertical sync stripper 59, which comprises vertical sync pulses, is coupled to an input of memory control unit 25 for the purpose described below.

The operation of elements 52–56 in response to the receipt of noiseless and noisy horizontal sync pulses, the absence of horizontal sync pulses, and the receipt of displaced horizontal sync pulses lying outside the six microseconds wide window is described in detail in U.S. Pat. No. 3,860,952, the disclosure of which is hereby incorporated by reference and, accordingly, will not be repeated in detail herein. Briefly, these elements remove any noise lying outside the six microsecond range from incoming horizontal sync pulses, and generate uniform PROCESSED H pulses having a uniform width of three microseconds for each valid horizontal sync pulse and every other equalizer pulse received. In addition, when a horizontal sync pulse is missing or is displaced to such an extent that it lies outside the six microseconds wide window provided by window control unit 53, the six microsecond mask is removed approximately 80 microseconds after the previously received pulse so that the next succeeding horizontal sync pulse need only meet the criterion of a 15 microsecond window provided by a RAMP signal, described below.

Input clock unit 14 further includes a voltage controlled oscillator 60 which, in the absence of a control signal at the input thereto, generates a signal train having a frequency $12f_c$. The output of voltage controlled oscillator 60 is coupled to the input of a conventional divider circuit 61 which divides the $12f$ signal input thereto down to a first reference signal having a frequency $3f_{in}$ which is coupled to an input of memory control unit 25 and the clock input of ADC 13; a second reference signal having a frequency $f$, which is coupled to a first input of a second phase comparator 62 and a third reference signal having a frequency 2H which is coupled directly to a first input of an AND gate 63 and indirectly via a conventional divide-by-two circuit 64 to the remaining input of AND gate 63. The output of AND gate 63, designated RAMP, which is a 15 microseconds wide periodic pulse train, is coupled to the remaining input of AND gate 51 and the remaining input of first phase comparator 57.

Phase comparator 57 and phase comparator 62 are both conventional units for providing an output control signal whose magnitude varies with the phase difference between the two input signals thereto. In addition, phase comparators 57, 62 are both provided with an internal sample and hold circuit which retains the correction voltage between successive phase comparisons, i.e., in the period between successively received PROCESSED H pulses in the case of comparator 57, and color burst from successive video lines in the case of comparator 62.

As noted above, f reference signal is coupled from divider 61 to a first input of phase comparator 62. The remaining input to phase comparator 62 comprises the color burst signals received from input video amplifier 22. Thus, phase comparator 62 provides a DC correction voltage whose magnitude varies in accordance with the phase difference between the two input signals. The output of phase comparator 62 is coupled to the input of a conventional shunt switch 65. The output of shunt switch 65 is coupled directly to a separate input of a summing amplifier 66 and also to the input of a conventional integrator circuit 67, the output of which is also coupled to a separate input of summing amplifier 66.

Shunt switch 65 is provided with a control input which is coupled to the output of AND gate 58. The inputs to AND gate 58 are PROCESSED H and the CHROMA DETECT control signal supplied by input video amplifier 22.

Whenever both signals are present at the input to AND gate 58, any error signal from phase comparator 62 is coupled through shunt switch 65 to elements 66, 67. Conversely, when either of the signals input to AND gate 58 are absent any error voltage from the output of phase comparator 62 is shunted to ground.

In addition to the signals noted above, summing amplifier 66 is provided with a horizontal phase calibration signal obtained from a manually adjustable variable resistance 68.

In operation, in the absence of any time base error in the incoming video signal, voltage controlled oscillator 60 generates a $12f_c$ signal train. This signal train is divided down by a divider 61 to provide $3f_c$ (10.7 MHZ) clock signals, $f$ phase reference signals for phase comparator 62 and VCO 2H reference signals. The latter are processed by divide-by-two circuit 64 and AND gate 63 to produce the RAMP signal, which comprises a 15 microseconds wide square wave train centered about the expected arrrival time of successive horizontal sync pulses. Calibration of the input VCO unit is achieved empirically by injecting a standard video test pattern into the system and adjusting potentiometer 68 while observing the video output of the unit on a suitable test instrument, (e.g., an oscilloscope) until the horizontal sync portion of the video output appears in standard form. Once adjusted, the properly phasel RAMP signal provides a 15 microsecond wide window for the pulse discriminator portion of input clock unit 14, and also serves as a reference input to phase comparator 57. In the absence of any time base errors in the incoming video signals, neither phase comparator 57 nor phase comparator 62 produces a correction voltage, and voltage controlled oscillator 60 continues to generate the signal train at $12f_c$.

If the incoming video signal contains time base errors, the phase difference between PROCESSED H and RAMP signals causes phase comparator 53 to produce a first correction voltage which is coupled via summing amplifier 66 to the control voltage input of voltage controlled oscillator 60. In addition, if the remote video input signals are NTSC DIRECT color signals of sufficient strength, denoted by CHROMA DETECT at the input to AND gate 58, any phase difference between the color burst signal and the $f$ reference signal from divider 61 causes phase comparator 62 to produce a correction voltage at the output thereof which is coupled via shunt switch 65 to summing amplifier 66 and to the input of integrator 67. If the color portion of the remote input video signal lies below a predetermined threshold (CHROMA DETECT absent), shunt switch 65 shunts the error voltage from the output of phase comparator 62 so that voltage controlled oscillator 60 is not affected thereby. In the absence of a disable signal, the correction voltage resulting from phase differences in the color portion of the signal is coupled to the control voltage input of voltage controlled oscillator 60 and is also integrated over a period of several lines by integrator 67.

Receipt of the control voltage signal by the voltage controlled oscillator 60 causes the frequency of the output signal to shift from $12f_c$ to a different frequency 12f in order to compensate for the detected phase differences. This change in frequency is reflected in the various output signals from divider 61.

In summary, input clock unit 14 includes two phase correction loops for adjusting the frequency of input voltage controlled oscillator 60. The first, or H, loop provides a coarse correction which compensates for large time base errors. A second, or fine, loop provides a fine correction which compensates for small time base errors. In addition, the fine loop integrator 67 provides a time averaged correction voltage, averaged over several lines of video, wich compensates for random 180° color phase lock errors. It is further noted that the second loop is only active during the receipt of DIRECT color signals. The resulting $3f_{in}$ raw clock signals, which are phase and frequency locked to the remote video signal are applied to ADC 13 and memory control unit 25 for the purpose noted above, for each successive line of video, with the exception of that portion of each line containing horizontal sync, blanking and color burst information, until the end of the field. Deletion of horizontal sync, blanking and color burst is controlled by memory control unit 25 in the manner described below. This arrangement enables an entire field of video information to be completely contained in a smaller shift register unit 24 than that which would ordinarily be required. If desired, however, this feature may be eliminated without adversely affecting the performance of the system.

ANALOG-TO-DIGITAL CONVERTER

Analog-to-digital converter 13, shown in FIG. 6, is similar to that described in detail in the aforementioned reference U.S. patent. To avoid prolixity, a detailed discussion of the construction and operation of the unit is omitted from this specification. Briefly, analog-to-digital converter 13 is a parallel-serial converter which converts each sampled portion of the incoming analog video information into an 8 bit binary code digital character. Each sampled portion is converted to a digital character in two successive 4-bit parallel conversions using binary encoders 71, 84. The analog video input signals are sampled at the rate $3f_{in}$ in response to the receipt of each sample pulse from input clock unit 14.

OUTPUT SYNC GENERATOR 37

With reference to FIG. 7, output sync generator 37 comprises a conventional TV sync generator 80 having an internal oscillator and divider circuits for generating composite blanking, composite sync, burst flag and an internal color reference subcarrier $INTf_{sc}$. The horizontal sync and vertical sync reference signals supplied from video amplifier and sync stripper 36 serve as reference signals for synchronizing the several output reference signals from sync generator 80 in a conventional manner. The burst flag output signals are coupled to an input of an AND gate 81, the remaining input to which is the chroma detect signal from input video amplifier 22. The output of AND gate 81 is coupled to the enable input of a shunt switch 82 similar in operation to shunt switch 65 of input clock unit 14. The $INTf_{sc}$ color reference signals are coupled to a first input of a phase comparator 83, the output of which is coupled to the transfer input of shunt switch 82. The output of shunt switch 82 is coupled to the control input of a voltage controlled oscillator 84 similar to VCO 60 of input clock unit 14. The output of VCO 84, wich comprises a signal train having a frequency of about 12 $f_c$, is coupled to the input of a conventional divider 85 which provides a first output signal train $3f_{out}$ having a frequency of about 3 times $f_c$ and a second reference signal train $f_{out}$ having a frequency of about $f_c$. This latter reference signal is coupled to the remaining input of phase comparator 83.

In operation, INT $f_{sc}$ signals from sync generator 80 are phase compared with the $f_{out}$ reference signals and any error signal generated by phase comparator 83 is coupled to the control voltage input of VCO 84 during burst time to correct the frequency and phase of the $12_f$ output signal from VCO 84.

MEMORY CONTROL UNIT 25

Memory control unit 25 is shown in FIG. 8. Generally, this unit develops supervisorial and clocking signals for shift register unit 24 and Vernier RAM assembly 30 and also provides tap select signals for specifying both the time of tap selection and also the specific taps from which the next field of remote video is to be output to Vernier RAM assembly 30.

Figure 9A:
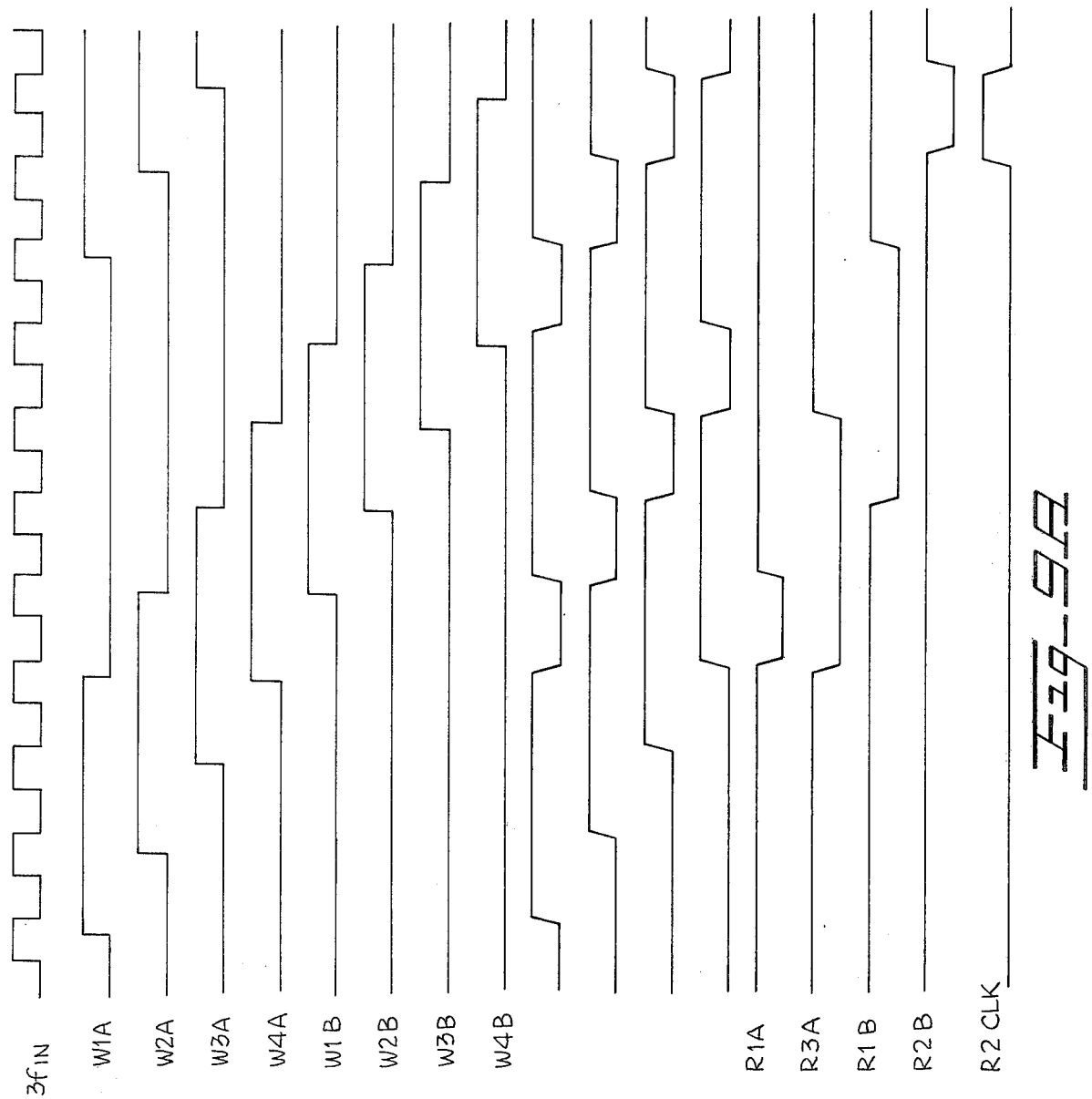
FIGS. 9A, 9B and 10 are timing diagrams illustrating operation of memory control unit 25.
Figure 9B:
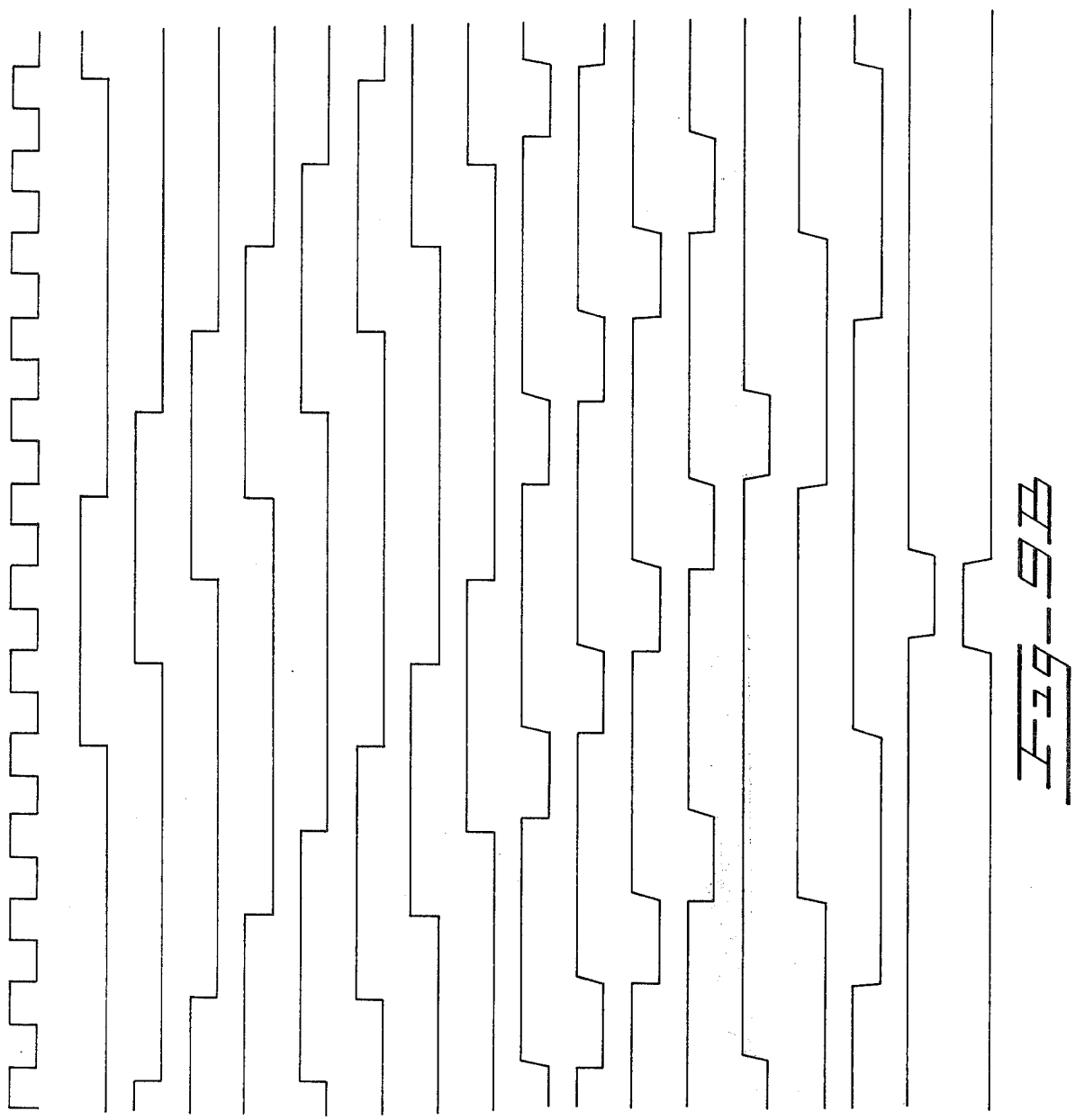

More particularly, memory control unit 25 includes an 8-phase input clock 90 which is driven by $3f_{in}$ input clock signals supplied by input clock unit 14 and which generates eight sequentially appearing shift register input clock signals designated W1A – W4A and W1B – W4B each of which is active for a duration of three input clock cycles, successive clock signals being spaced by one cycle of the input clock signal as shown in the wave form diagram of FIG. 9. The clock signals from eight phase clock 90 are coupled to shift register unit 24 and control loading of the digital video characters from ADC 13 and progressive shifting of the characters along shift register unit 24.

Eight phase clock generator 90 also generates four additional signals R1A, R1B, R3A, and R3B with timing as shown in FIG. 9 for reading digital video characters from shift register unit 24 into the input side of Vernier RAM assembly 30.

The $3f_{in}$ driving signal for eight phase clock generator 90 is disabled during horizontal sync and burst portions of each line of incoming video information and also for a period from the end of a field to approximately ten lines after the beginning of a new field. This is effected in the following manner.

Processed $H_{in}$ and $V_{in}$ supplied from input clock unit 14 are respectively coupled to the input of a 6 microsecond one shot circuit 91 and an adjustable one shot circuit 92 providing a delay of about ten lines after the leading edge of $V_{in}$ signal. The outputs of one shot circuits 91, 92 are coupled through an OR gate 93 and an inverter 94 to the enable input of an AND gate 95. In addition the output of one shot circuit 91 is gated by an AND gate 96 for a purpose to be described. The remaining inputs to AND gate 95 comprise $3f_{in}$ signals and a signal designated END OF WRITE FIELD which is generated in the manner described below at the end of the last line of video information in the incoming video field. Whenever one shot 91 or one shot 92 has been triggered, the disable write signal generated in response thereto disables AND gate 95 to remove the driving signal input from eight-phase clock 90. In addition, the END OF WRITE FIELD signal blocks gate 95 from the end of a field of incoming video to the beginning of vertical sync in the next successive field.

The W4A signal from eight-phase clock 90 is coupled to the input of a write line counter 97 which comprises a conventional scale of 72 counter, and also to the input of a scale of 512 counter. Write line counter 97 generates an output pulse when incremented full, which occurs after 576 sample times, which is used to set a flipflop 98. When flipflop 98 sets, indicating the end of a line of video information, eight-phase clock 90 is reset by the output pulse therefrom. Flipflop 98 is reset after one shot 91 times out or upon occurrence of an END OF FIELD signal which is generated in the manner described below.

Scale of 512 counter 99 generates an output signal when counted full signifying that a block of data, defined as 4,096 bits, has been loaded into shift register unit 24. This output signal is coupled to a block counter 100 which comprises a scale of 36 counter. When block counter 100 is counted full signifying that 36 blocks of digital video information, which corresponds to an entire field of information, have been written into shift register unit 24, an output signal is generated which sets a flipflop 101. When flipflop 101 sets, an END OF FIELD signal is generated which resets write line counter 97, flipflop 98, and also blocks gate 95 to disable operation of eight-phase clock 90. Flip/flop 101 is reset after the time out of one shot 92 in response to the next succeeding $V_{in}$ pulse. This signal from one shot 92 is also used to reset scale of 512 counter 99 and block counter 100.

The state at any given time of block counter 100 is coupled via a data bus 102 to the data input of a register unit 103 designated X-2 register unit. X-2 register unit 103 provides tap select information via bus 26 to shift register unit 24 as described more fully below.

W3B is also coupled to the input of a 100 nanosecond delay unit 105, the output of which (designated R2 clock) is coupled to a register R2 on the input side of Vernier RAM assembly 30 as described more fully below. In addition, W3B clock signals are also employed to initiate a write request for Vernier RAM assembly 30.

Figure 10:
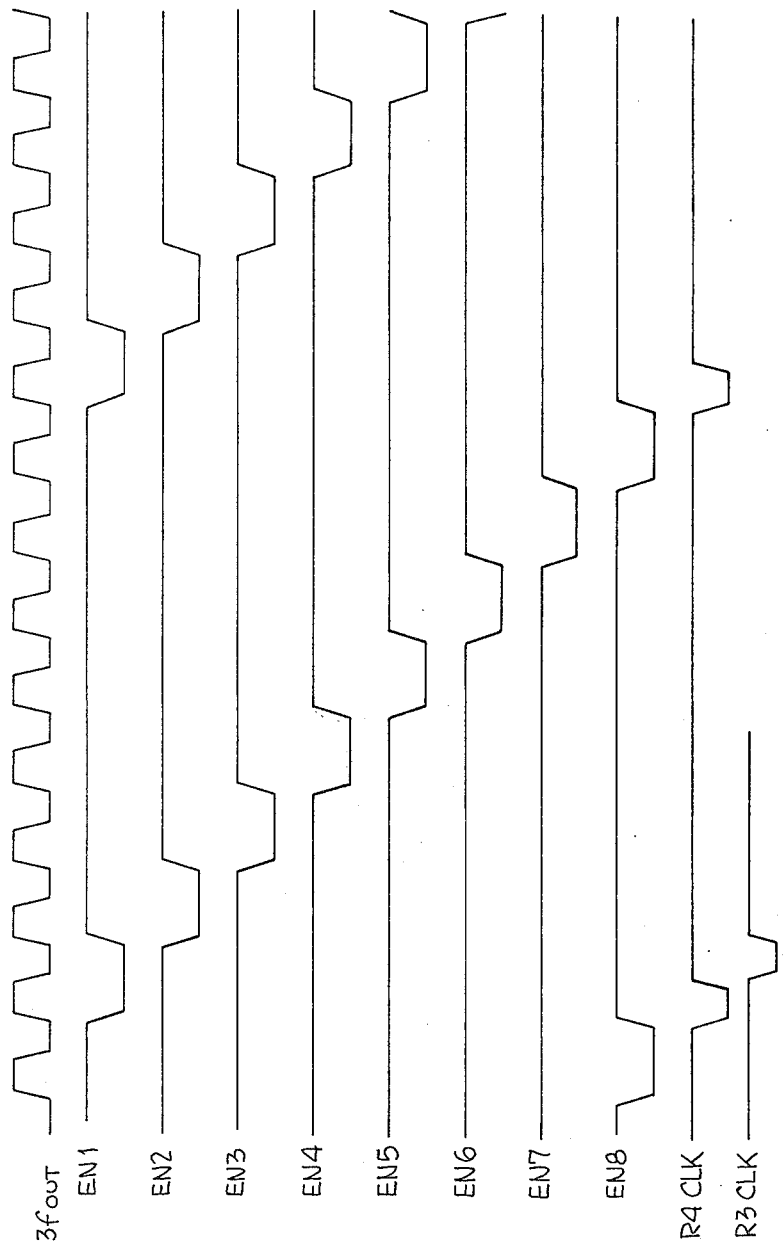

Memory control unit 25 further includes a second eight-phase clock 110 driven by a signal termed RAM OUTPUT CLOCK having a frequency equal to the 3f out reference signals supplied from multiplier 44 for generating eight sequential clock signals termed EN1-EN8 used to read digital video characters out from Vernier RAM assembly 30 to DAC 17. As shown in FIG. 10, these eight clock signals each have a period equal to one cycle of the 3f out reference signal and are sequentially generated. Similarly to the operation of eight-phase clock 90, the driving signal to eight-phase clock 110 is disabled during horizontal sync and burst portions of each line of local video information, and for a period of time beginning at the end of a field of local video and ending approximately ten lines after the beginning of the next succeeding field. This is accomplished in a similar manner to that described above by circuit elements 111–115. In addition, however, since the input reference timing signals supplied from output sync generator unit 37 comprise composite sync, rather than H sync and V sync, a horizontal sync detector 116 and a vertical sync detector 117 are included upstream of one shot circuits 111 and 112, respectively.

The RAM output clock signal is phased with $3f_{in}$ reference signals to ensure proper color reference phase in the digital video signals output from Vernier RAM assembly 30. For this purpose, $3f_{in}$ signals are coupled to the D input of a D-type flipflop 120 which is clocked by the output of one shot circuit 92 approximately ten lines after the beginning of a field of incoming video information. Depending on the phase of $3f_{in}$ reference signals at that time, flipflop 120 will achieve one of two states. The state of flipflop 120 is transferred to a second flipflop 121 approximately ten lines after the beginning of the next field of video information in the local signal by the time-out of one shot 112. The complementary outputs of flipflop 121 are coupled to one input of a pair of AND gates 122, 123. The remaining input to AND gate 122 is 3f out reference signal; the remaining input to AND gate 123 is 3f out reference signal inverted by an inverter 124. The respective outputs of AND gates 122, 123 are coupled to the inputs of an OR gate 125 which furnishes the RAM output clock. Accordingly, during reading of an entire field of video information from Vernier RAM 30 to DAC 17, the RAM output clock will have a phase which is identical to the phase of the $3f_{in}$ reference signal with which the field of information being read out was stored.

The EN1 and EN8 clock signals from eight-phase clock 110 are used to develop additional clocking signals designated R3 clock and R4 clock which are used to sequentially transfer digital video characters from a holding register R3 to an output register R4 of Vernier RAM assembly 30 and from the RAM portion of assembly 30 to the holding register R3 as described below. The R4 clock signal, which is generated approximately 50 nanoseconds after the start of EN8 by delay unit 126, is also used to increment the RAM read address counter 127 which provides read address information on a data bus 128 to a first data input of a RAM multiplexer 130.

The EN8 clock signals are also coupled to the input of a read line counter 132 and the input of a scale of 512 counter 133, both of which elements are essentially identical to write line counter 97 and scale of 512 counter 99, respectively. Read line counter 132 generates an output pulse for each 576 sample times, corresponding to a line of local video information which is used to set a flipflop 134 which generates an END OF READ LINE signal used to reset 8 phase clock 110. The output of scale 512 counter 133 is coupled to the input of a block counter 135 which functions in a manner similar to counter 100 and generates an output signal whenever 36 blocks of data corresponding to an entire field of video information have been read from Vernier RAM assembly 30. This output signal is used to set a flipflop 136 which generates an END OF READ FIELD signal. The END OF READ FIELD signal blocks AND gate 115, resets flipflop 134 and initializes read line counter 132. Scale of 512 counter 133, block counter 135 and flipflop 136 are all reset approximately 10 lines after the beginning of the next field of local video information.

Memory control unit 25 also controls the write and read operations performed in the RAM portion of Vernier RAM assembly 30 as follows. Clock signal W3B from 8 phase clock 90 is coupled via an AND gate 138 to the input of a flipflop 140 which specifies a WRITE REQUEST signal when set. Similarly, the R4 clock signal from the output of 50 nanoseconds delay unit 126 is coupled via an AND gate 139 to the input of a flipflop 141 which generates a READ REQUEST signal when set. Flipflops 140, 141 are each coupled to the input of a different one shot circuit 142, 143, respectively, each of which has a time out period of approximately 280 nanoseconds equal to the cycle time of the RAM. The active output of each flipflop 140, 141 is cross-coupled to the clear input of the other flipflop, so that setting of the one disables a subsequent setting of the other until the end of a RAM cycle. The outputs of one shot circuits 142, 143 are also coupled to the RAM portion of Vernier RAM assembly 30 and to separate inputs of multiplexer 130, to the data transfer inputs of which are coupled the data bus 128 from RAM read address counter 127 and the data bus 129 from RAM write address counter 146. The output of one shot 142 is also coupled to the input of write RAM address counter 146 and is used to increment this counter. RAM read address counter 127 is incremented by the occurrence of R4 clock signal.

With a select signal present at one of the select inputs of multiplexer 130, either the RAM write address counter state or the RAM read address counter state is coupled via an address data bus 146 to the RAM portion of Vernier RAM assembly 30. When one shot circuit 142 or 143 times out after the cycle time of the RAM, the active flipflop 140 or 141 is reset to enable subsequent operation.

In order to prevent the writing into or reading out from Vernier RAM assembly 30 of more than one field of incoming or local video information, the RAM write address counter 146 and the RAM read address counter 127 outputs are each coupled to a separate detector 150, 151, each of which generates an output signal when 36 blocks of digital video information corresponding to 147,456 words have been written into or read from Vernier RAM assembly 30, respectively. The output from detector 150 is coupled to the enable input of AND gate 138; the output of detector 151 is coupled to the enable input of AND gate 139. When either of these control signals are present at the enable input at the respective AND gate, the corresponding function is blocked until the associated detector is reset by the output of one shot circuit 92 (detector 150) or one shot circuit 112 (detector 151).

Memory control unit 25 also controls tap selection in the following manner. As noted above, the state of block counter 100 is presented via data bus 102 to the input of X −2 register unit 103. X−2 register unit 103 is conditioned for subsequent acceptance of the information at the input thereto by the signal generated by one shot circuit 112 approximately 10 lines after the beginning of a field of local video information. The information is strobed into an input register of X − 2 register unit 103 by the next output signal from one shot circuit 92 which occurs approximately 10 lines after the beginning of the next field of incoming video information. The X − 2 register unit 103 thereafter subtracts the value 2 from the value of the data therein (which correction is required since Vernier RAM assembly 30 has a capacity of two blocks of digital video information), and this new value is strobed into an output register in unit 103 by the next occurring W3B clock signal. This is effected by a one shot circuit 155 which is triggered by the strobe signal supplied from one shot circuit 92 in order to enable an AND gate 156 for a period of time which lasts until the occurrence of the next W3B clock signal. The output of AND gate 156 is also coupled to the reset input of the RAM write address counter 146 to reset this unit to the first address in the RAM portion of Vernier RAM assembly 30.

FIELD MEMORY UNIT 15

Field Memory Unit 15, which comprises shift register unit 24 and Vernier RAM assembly 30 is shown in FIG. 11. Shift register unit 24 comprises eight individual shift registers each storing a different bit of the 8 bit digital video characters supplied from ADC 13. Each shift register has four different strings each having a capacity of 36,384 bits and designated as the A, B, C and D register strings 160-163. For convenience, each of the A, B, C and D register strings of all eight registers are illustrated as single blocks. The eight lines of data from ADC 13 are coupled to the A, B, C and D register strings of all eight registers. Data is sequentially input to the A–D register strings 160–163 by the W1A–W4A, W1B–W4B clock signals, with loading occurring at the leading edges thereof. For example, the A register strings 160 are loaded at the leading edge of W1A and W1B, the B register strings are loaded at the leading edge of W2A, W2B, etc. These eight clock signals are also used to shift data along the individual register strings from the input to the selected output tap.

Each of the shift register strings 160–163 is provided with 36 output taps coupled to the data inputs of four multiplexer units 165–168, which are controlled by the tap select signals on data bus 26 in such a manner that the identical output tap from register strings 160–163 is transferred through the corresponding multiplexer unit 165–168 and coupled to an input register R1 of Vernier RAM assembly 30 via a 64 bit data bus 170. Input register R1 has a capacity of 8 words (64 bits). The data on bus 170 is sequentially strobed into input register R1 by the R1A, R1B, R3A and R3A clock signals, the eight bit words from shift register strings 160 and 161 being clocked into the top half of input register R1 by the R1A and R3A clock signals, and the 8 bit words in shift register strings 162 and 163 being strobed into the lower half of input register R1 by R1B and R3B clock signals. During a load cycle, two words are stored from each of the register. and 163 being strobed into the lower half of input register R1 by R1B and R3B clock signals. During a load cycle, two words are stored from each of the register strings 160–163, i.e., a first word from register strings 160–163 followed by a second word from register strings 160–163, so that input register R1 is fully loaded before transfer of the contents thereof to a holding register R2.

The eight words stored in input register R1 are transferred in parallel to holding register R2 having the same capacity as input register R1 by the R2 clock signals which occur after loading of the R1 input register. The data in holding register R2 is read into RAM 175 upon occurrence of the write control signal supplied from memory control unit 25.

RAM 175 is a conventional unit having a capacity of two blocks of data, i.e., 8,192 8-bit digital characters. The location into which the data is written is specified by the address supplied from memory control unit 25 on bus 146.

Data is read from RAM 175 in response to the occurrence of a read control signal supplied by memory control 25 into a holding register R3 in response to the occurrence of an R3 clock supplied from memory control unit 25. The data in holding register R3 is transferred in parallel to output register R4 by the occurrence of an R4 clock supplied from memory control unit 25. The capacity of registers R3 and R4 are equal to the capacities of register R1 and R2. The 8 bit digital characters in output register R4 are output therefrom sequentially in response to the sequential appearance of the EN1–EN8 clock signals supplied from memory control unit 25.

DAC 17

DAC 17 is shown in FIG. 12. The incoming 8 bit digital video characters supplied from output register R4 of Vernier RAM assembly 30 via data bus 178 are coupled to the data inputs of a high speed digital to analog converter 179 which is clocked by the $3f_{out}$ reference signals supplied from multiplier 44. The output of DAC 17 is coupled to the input of a conventional sample-and-hold circuit 180 which is clocked by $3f_{out}$ reference signals delayed by one-half clock cycle (47 nanoseconds) by a conventional delay unit 181. The analog video output signals from sample-and-hold circuit 180 are passed through a conventional video low pass filter 182 and an amplifier 183 to the input of processor amplifier 18.

PROCESSOR AMP 18

With reference to FIG. 13, incoming DAC video analog signals are coupled to the input of a conventional DC restore circuit 220 having a level setting control input thereto from the internal sync generator. The video output signals from DC restore unit 220 are coupled via a buffer amplifier 221 and a limiter 222 to a summing junction 223. Limiter 222 has a control input coupled to the output of a blanking shaper 224, which is preferably a conventional slew rate limiter, controlled by COMPOSITE BLANKING reference signals obtained from the studio sync generator. Blanking shaper 224 provides a slewed control pulse for limiter 222 which avoids the introduction of transients on the edges of the signal output therefrom to summing junction 223. The composite blanking signals used to drive blanking shaper 224 improve the ability of the limiter 222 to remove undesired sync portions of the signal which may be remaining in the now-synchronized DAC VIDEO signals input to DC restore circuit 220.

New color burst is generated for combination with the synchronized DAC VIDEO signals from $f_{out}$ reference frequency signal train obtained from the studio sync generator. These signals are coupled via a limiter amplifier 226 to the carrier input of a conventional balanced modulator and driver 227. The remaining input to modulator and driver 227 is obtained from the output of a conventional burst flag shaper 228 which is preferably a slew rate limiter driven by the BURST FLAG signals obtained from the studio sync generator. The output of balanced modulator and driver 227 is a synthetic burst signal which is linearly combined in summing junction 223 with the synchronized video information signal output from limiter 222.

The output of summing junction 223 is AC coupled to a first input of a differential video amplifier 230, the remaining input to which is COMPOSITE SYNC reference signal obtained from the studio sync generator and passed through a conventional sync shaper circuit 231.

A pair of individually adjustable variable resistances 232, 233 are provided for enabling adjustment of the video and sync levels, respectively, of the output video signals. The output of video amplifier 230 is coupled to the output terminal of the system, which provides the synchronized composite video signals to appropriate follow-on devices.

SYSTEM APPLICATIONS

In addition to the generalized configuration illustrated in FIG. 1 in which a first signal designated Input Signal A is synchronized to a second signal designated Input Signal B, with Input Signal A being transmitted to the follow-on equipment, e.g. the transmitting link, other system configurations are possible with the invention. With reference to FIG. 14, a first video signal from a first remote source, termed Remote A, is applied to a first input terminal 235 and a second video signal from a second remote source, termed Remote B, is coupled to another input terminal 236. These two terminals are directly couplable by means of a single pole single throw switch 237 to the remote input terminal 11 of video synchronizer unit 10. The local video type signal is coupled to input 12 of unit 10.

In operation, with nonsynchronized video signals present on terminals 235 and 236, either signal may be coupled through unit 10 and presented to the output terminal 19 by merely manipulating switch 237, a process known in the art as hard switching. When operating in the hard switching mode with the preferred embodiment, a 33 milliseconds maximum disturbance occurs when the switch 237 is manipulated from one position to the other and remote A and remote B signals are not synchronized with each other. The maximum observable effect resulting in the worst case condition is visible as a brief flash on the television screen but is not so severe as to be objectionable.

FIG. 15 illustrates another system configuration or mode of operation in which either the remote signal on input terminal 11 or the local video signal on input terminal 12 and used as the synchronizing source may be coupled as the video signal of interest to the downstream follow-on equipment. In this configuration, the synchronized remote video signals present on output terminal 19 of the video synchronizer unit 10 are coupled to the first input of a conventional multiplexer unit 240. The local composite video signals are coupled to the second information input terminal of multiplexer 240. A remote/local select control signal is coupled from an appropriate source to the control input of multiplexer 240. The source of the remote/local select control signal may comprise a manually actuable switch or the like.

In operation, when the select control signal enables transfer via the upper input terminal of multiplexer 240 the synchronized remote composite video signals are presented to the output terminal 241. When the select control signal enables transfer via the lower input terminal of multiplexer 240 the local composite video signals are presented to output terminal 241. This system configuration enables instantaneous switching from a remote source to local video with substantially no observable disturbance.

FIG. 16 illustrates another application of the invention especially configured for processing field sequential color video signals, which comprise color video signals in which each line contains only one type of chrominance information, e.g., red, green or blue, with the different types of chrominance information appearing sequentially line-by-line e.g., red, blue, green, red, blue, green, etc. The field sequential color video signals are coupled to the remote terminal input 11 of the video synchronizer unit 10 and station sync signals are coupled to the local video input of first video synchronizer unit 10. The output of the first video synchronizer 10, which is synchronizer to local video, is coupled to both remote video and local inputs of a second video synchronizer unit 10A, and the output of second video synchronizer 10A is coupled to both the remote and local video input terminals of a third video synchronizer unit 10B. The video signals output from unit 10A are delayed by one entire field; the video signals output from unit 10B are delayed by two entire fields from the input to unit 10A. The outputs of units 10, 10A and 10B are coupled to three separate inputs of a multiplexer unit 250 along with appropriate timing signals which are applied to the select input of multiplexer 250.

Multiplexer unit 250 comprises three 3 pole electronic switches which are scanned by the timing signals to continously select various ones of the three output terminals. Thus, that input signal containing red chrominance information is coupled to the R output, that input terminal having the chrominance information is coupled to the B output and the remaining input terminal having green chrominance information is coupled to the G output terminal. By sequencing multiplexer unit 250 at the end of each field, the red, blue and green chrominance input signals are multiplexed to the red, blue and green output terminals, from which they may be coupled to a conventional color encoder and monitored.

As will now be apparent, the invention provides a versatile video synchronizing unit which can be used in many different applications to synchronize to unrelated video signals. While the above provides a full and complete disclosure of the preferred embodiments of the invention, various modifications, alternate constructions and equivalents may be employed without departing from the true spirit and scope of the invention. For example, a RAM 175 having a different storage capacity than two blocks of data may be employed, if desired, and the appropriate timing and control signals may be modified accordingly. Therefore, the above description and illustrations should not be construed as limiting the scope of the invention which is defined by the appended claims.

What is claimed is:

1. The method for synchronizing first and second input video type signals each of which comprises horizontal sync portions, said method comprising:
    a. successively sampling said first video input signal at a first clock rate derived from said first video input signal;
    b. storing the signals sampled in step (a) in a memory;
    c. delaying said signals in said memory for a predetermined delay interval determined by the difference in phase between predetermined portions of said first video input signal and said second video input signal;
    d. reading the signals stored in said memory at a second clock rate synchronously related to said second video input signal; and
    e. periodically changing said predetermined delay interval when said phase difference varies.

2. The method of claim 1 wherein said step (a) of sampling includes the step of converting said first video input signal from analog-to-digital form.

3. The method of claim 1 wherein said first clock rate is synchronously related to the horizontal sync portion of said first input video signal.

4. The method of claim 3 wherein said input video signals further include color burst portions and said first clock rate is also synchronously related to the color burst portion of said first input video signal.

5. The method of claim 1 wherein said step (c) of delaying includes the step of (i) clocking said storage signals along a shift register having a plurality of taps each providing a different fixed delay period.

6. The method of claim 5 wherein said step of delaying further includes the step (ii) of storing the signals output from one of said taps in a random access memory at said first clocking rate.

7. The method of claim 1 wherein said second clock rate is synchronously related to the horizontal sync portions of said second input video signal.

8. The method of claim 7 wherein said input video signals further include color burst portions and said second clock rate is also synchronously related to the color burst portions of said second input video signal.

9. The method of claim 1 wherein said step (e) is performed at the beginning of a field in said first video input signal.

10. A video synchronizer system for synchronizing first and second input video signals each of which comprises horizontal sync portions, said system comprising:
  means for successively sampling said first video input signal at a first clock rate derived from said first video input signal;
  memory means coupled to said sampling means for storing the signals sampled in said sampling means;
  means coupled to said memory means for delaying said signals stored in said memory means for a predetermined delay interval determined by the difference in phase between predetermined portions of said first video input signal and said second video input signal;
  means coupled to said memory means for reading the signal stored in said memory means at a second clock rate synchronously related to said second video input signals; and
  timing means coupled to said memory means for periodically changing said predetermined delay interval when said phase difference varies.

11. The combination of claim 10 wherein said sampling means includes an analog-to-digital converter means for generating successive multibit digital characters from said first input video signals.

12. The combination of claim 10 wherein said first clock rate is synchronously related to the horizontal sync portions of said first input video signal.

13. The combination of claim 12 wherein said input video signals further include color burst portions and said first clock rate is also synchronously related to the color burst portions of said first input video signal.

14. The combination of claim 10 wherein said memory means includes a shift register having a plurality of output taps each providing a different fixed delay period, and wherein said timing means includes means for selecting one of said plurality of output taps.

15. The combination of claim 14 wherein said memory means further includes a random access memory having a data input coupled to one of said output taps.

16. The combination of claim 10 wherein said second clock rate is synchronously related to the horizontal sync portions of said second video signal.

17. Th combination of claim 16 wherein said input video signals further include color burst portions and said second clock rate is also synchronously related to the color burst portions of said second input video signal.

18. The combination of claim 10 wherein said timing means includes means for changing said predetermined delay interval at the beginning of a field of video information in said first input video signal.

* * * * *